Nov. 5, 1929. J. N. HEALD ET AL Re. 17,477

GRINDING MACHINE

Original Filed July 14, 1922 2 Sheets-Sheet 1

Inventor:
J. N. Heald & A. Turner
By Geo. H. Kennedy Jr.
Attorney

Nov. 5, 1929. J. N. HEALD ET AL Re. 17,477
GRINDING MACHINE
Original Filed July 14, 1922 2 Sheets-Sheet 2
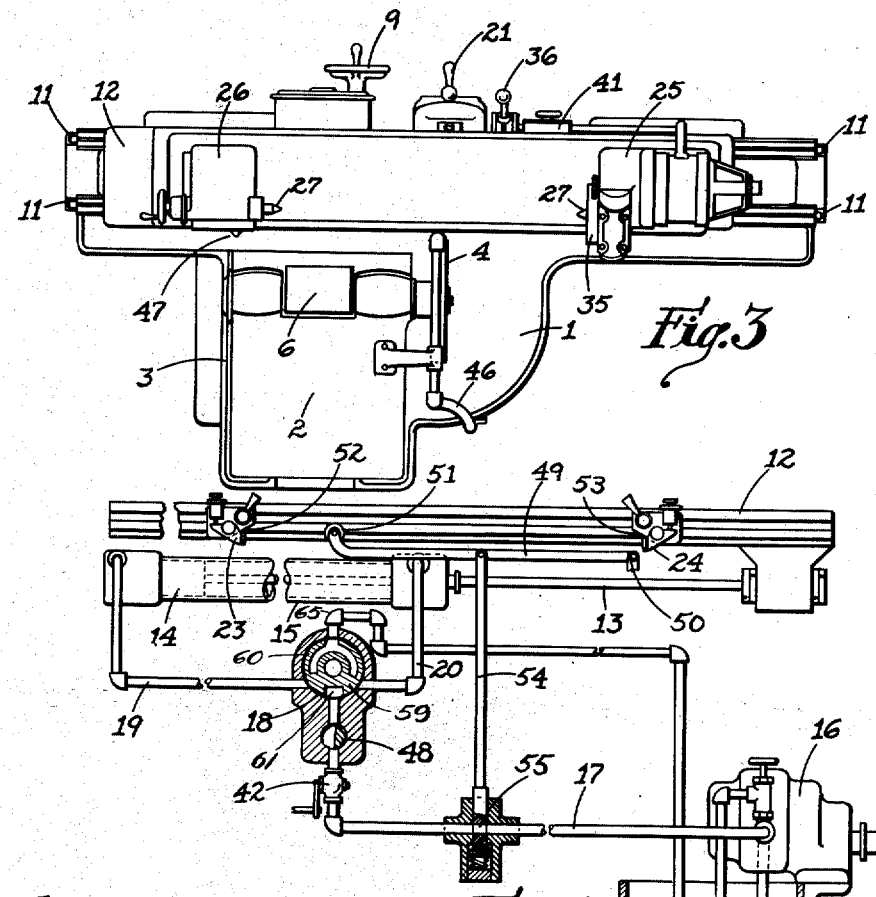
Fig. 3
Fig. 5
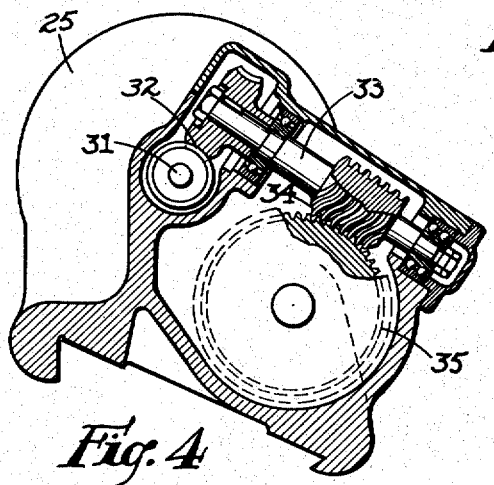
Fig. 4
Inventor:
J. N. Heald & A. Turner
By Geo. H. Kennedy Jr.
Attorney Reissued Nov. 5, 1929

Re. 17,477

UNITED STATES PATENT OFFICE

JAMES N. HEALD, OF WORCESTER, AND ALBERT TURNER, OF SHREWSBURY, MASSACHUSETTS, ASSIGNORS TO THE HEALD MACHINE COMPANY, OF WORCESTER, MASSACHUSETTS, A CORPORATION OF MASSACHUSETTS

GRINDING MACHINE

Original No. 1,583,351, dated May 4, 1926, Serial No. 574,940, filed July 14, 1922. Application for reissue filed February 7, 1927. Serial No. 166,576.

The present invention relates to grinding machines. The invention resides in the novel combination and arrangement of parts hereinafter fully described, of especial utility in the construction and operation of a grinding machine adapted to operate on cylindrical or similar surfaces, but equally applicable, in certain features, to a grinding machine adapted to operate on internal or concave surfaces, or on plane surfaces.

In the accompanying drawings,

Fig. 3 is a top plan view.

Fig. 4 is an enlarged detail sectional view of the head stock of the machine.

Fig. 5 is a schematic view, partly in section, of certain fluid pressure devices used for reciprocating the work.

Like reference characters refer to like parts in the different figures.

Figure 1:
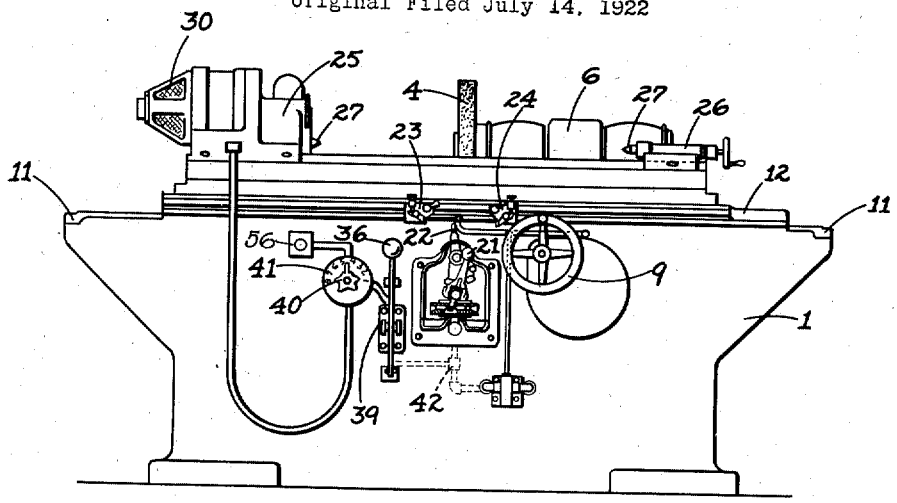
Fig. 1 is a view in side elevation of such a grinding machine, according to the present invention.

The improvements forming the subject matter of the present invention are here shown in connection with a plain grinding machine of the usual construction, embodying a suitable frame or base 1 which carries the usual wheel slide 2, the latter being transversely movable in ways 3, 3, provided by the machine frame. The slide 2 has journalled therein the spindle of a grinding wheel 4, the latter being driven at high speed by any suitable means, such as a belt 5 which connects the wheel pulley 6 with a driving pulley 7. The driving pulley 7 is mounted on a shaft 8, preferably journalled on the lower rear side of the base 1 and driven either from a motor, not shown, or from suitable countershafting, likewise not shown; in any event, the arrangement is such that the machine is self-contained as regards the drive of the grinding wheel 4, and the pull on the wheel spindle by the driving devices is therefore downward, thus supplementing the weight of the wheel slide 2 in the maintenance for the latter of a firm seat on the frame or base of the machine. The usual adjustment of the wheel slide 2 in the ways 3, 3 for the purpose of positioning the wheel for different sizes of work is accomplished by a hand wheel 9 on the front of the machine, the latter operating through a screw or other means, not shown, to obtain the cross-feed of the wheel 4. The wheel driving belt 5 is caused to accommodate itself to the various positions of the grinding wheel by a spring pressed tightener pulley 10, which is effective at all times against the rear side of said belt.

Figure 7:
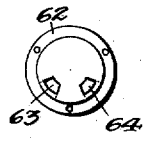
Fig. 7 is a detail view of the valve cap or closure.
Figure 6:
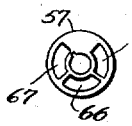
Fig. 6 is a detail view of the oscillating valve member.

On the front part of the machine frame provision is made for supporting and for rotating the piece of work, which, according to the usual practice, in machines of this class, is adapted to be given a back and forth longitudinal movement in contact with the periphery of the grinding wheel 4. To this end, the machine frame provides longitudinal ways 11, 11 for a sliding table 12, the movement of which, according to the present invention, is obtained by a fluid pressure controlling and reversing mechanism, of the type, for instance, disclosed in the copending application of Drake and Hubbell, Serial No. 528,118, filed January 9, 1922. As shown in Fig. 5, and as disclosed in detail in the aforesaid copending application, the table 12 is suitably connected, as by a rod 13, to a double acting piston 14, contained in a fluid pressure cylinder 15. The piston 14 is actuated by the admission of fluid under pressure to one end or the other of the cylinder 15, the fluid pressure being forced by a pump 16 into a supply pipe 17 which delivers to a valve device 18, the construction of which, forming no part of the present invention, is described and claimed in said copending application. The valve device 18 comprises a rotatable reversing valve member 57 (see Figs. 6 and 8) keyed to a shaft 58, a stationary member 59 having ports 60 and 61 and a valve cap 62 (see Fig. 7) having ports 63 and 64. Port 60 is in communication with return pipe 65 whereas port 61 is in communication with supply pipe 17. Port 63 is in communication with pipe 19 and port 64 with pipe 20. The relation of members 59, 57 and 62 is clearly shown in the sectional view Fig. 8, and if we assume that valve member 57 of Fig. 6 is projected without axial displacement onto stationary member 59 of Fig. 5, then the controlling devices for the table 12 are in the neutral position. Valve member 57 has three passes 66, 67 and 68. Pass 66 is always in communication with port 61 and so receives, at all times, the fluid entering at port 61. In the above described neutral position, pass 66 is also in communication with both ports 63 and 64 and at the same time passes 67 and 68 communicate with port 60 and also with ports 63 and 64. In this neutral position, then, the fluid will be shunted from pipe 17 through pass 66 to ports 63 and 64 through passes 67 and 68 to port 60, thence back by return pipe 65. At the same time, both pipes 19 and 20 are connected through ports 63 and 64 to the freely moving fluid, so that the fluid in cylinder 15 will not be constrained and the table 12 may therefore be moved by hand.

A lever 21 is also keyed to shaft 58, the upper end of this lever being fitted with a knob or handle, or the like. Assuming now that the lever 21 is moved to the position shown in Fig. 1, the valve member 57 will be rotated in a clockwise direction, thus breaking the connection between pass 67 and port 63 and also breaking the connection between pass 66 and port 64. It will be obvious then that the only outlet from port 61 for the fluid will be by way of pass 66 to port 63 and pipe 19, which will cause the piston 14 in cylinder 15 to move to the right carrying the rod 13 and table 12. This will force fluid at the right of piston 14 out of cylinder 15 through pipe 20 entering port 64 where it is constrained to pass through pass 68 to port 60 and so back by way of return pipe 65. It will be obvious, without further description, that movement of handle 21 to the left and consequent rotation of valve member 57 in a counterclockwise direction, causes fluid to enter cylinder 15 by way of pipe 20 and leave cylinder 15 by way of pipe 19, because of the symmetrical arrangement of members 57, 59 and 62.

Figure 8:
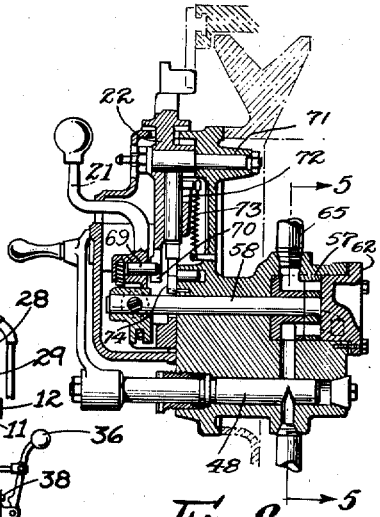
Fig. 8 is a transverse sectional view of the fluid pressure control and reversing mechanism.

As described, the reversing valve device 18 is operable, as shown in Figs. 1 and 8 herein, by the direction control lever 21, the latter having a disengageable pin 69, normally located in a slot 70 of a rocking member 22 whose upper end projects into the path of a pair of adjustable dogs 23 and 24 carried by the table 12. These stops or dogs engage the member 22 alternately, whereby to reverse the direction of travel of the table 12 at each engagement; their longitudinal adjustment determines the throw, or length of table travel, for any given operation. The lever 21 affords a means for interrupting or changing, when desired, the above described automatic action of the valve device 18, as obtained by the dogs 23 and 24, and also for procuring, when desired, an extended movement of the table 12, to remove the latter from the influence of said dogs. Member 22 is pivoted on shaft 71 and also has connected to it a plunger 72 forced downward by a spring 73. The end of plunger 72 is V shaped and operates in connection with a stationary cam member 74, whereby to snap member 22 quickly to the right or left after it crosses the central or vertical position.

Mounted on the reciprocating table 12 are the usual work supporting devices, here shown as a head stock 25 and a tail stock 26, the same providing suitable centers 27, 27 for the support between them of the work. The head stock 25 and the tail stock 26 are both directly supported for longitudinal adjustment in suitable ways 28, provided by a member 29, the latter adapted to swivel bodily on the table 12 in order to vary the angularity of the axis of the work, in the presentation of same to the grinding wheel 4.

For procuring rotation of the work on the axis provided by the centers 27, 27, the head stock 25 supports and carries an adjustable speed electric motor 30, the shaft 31 of which, as shown in Fig. 4, has a worm gear connection 32 with a countershaft 33, the latter being suitably journalled in the head stock and adapted to impart rotation by the worm gearing 34 to a driving plate 35, coaxial with the centers 27, 27 and engageable with the work in the usual manner.

Figure 2:
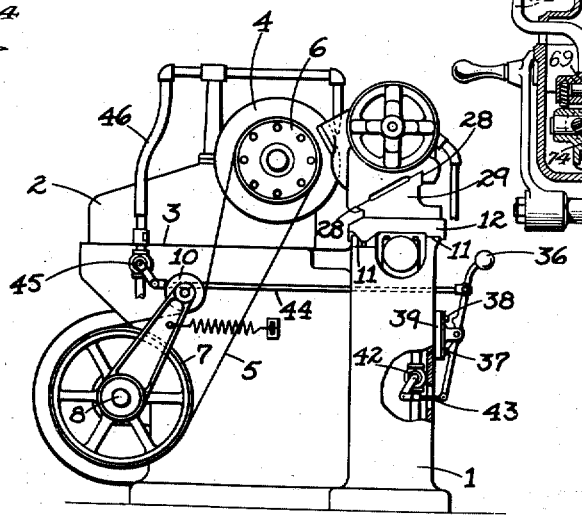
Fig. 2 is an end view of said machine.

On the front of the machine, adjacent to the direction control lever 21, and in convenient reach of the operator is a pivoted lever 36 which cooperates with start and stop buttons 37, 38 of a switch device 39 for motor 30. In the position of the parts shown in Fig. 2, wherein the lever 36 has been drawn outwardly, the starting button 37 is engaged, thus causing the motor 30 to impart rotation to the work at a speed which is determined by the position of the control lever 40 of a speed adjusting device 41 in the circuit of motor 30. In this position of lever 36, a valve 42 in the fluid pressure supply pipe 17 leading to valve 18 is held open by a link connection 43 with said lever 36. Also, by means of a link connection 44, a valve 45 in water pipe 46 is moved into open position, as shown in Fig. 2, thus insuring a supply of water for the grinding operation. When the lever 36 is thrown inwardly to engage the button 38 for stopping the motor 30, the valves 42 and 45 are closed by their respective links 43 and 44; this shuts off the pressure fluid, thus stopping the movement of table 12, and at the same time prevents wastage of water after the discontinuance of grinding.

For the dressing and truing of the wheel 4, by means, for instance, of a suitable diamond 47 on the tail-stock 26, the above described control mechanism affords special advantages; by holding the lever 36 in an intermediate position, so as not to engage the starting button 37, the motor 30 is kept from running and thus the work, during the periods when the wheel is being dressed, is not subject to rotation. However, this intermediate position of the lever 36 is accompanied by a partial opening of both the valves 42 and 45, through their respective link connections 43 and 44; this insures a supply of water for the wheel during the dressing operation, and also, a throttled-down reciprocation of the table 12 to carry the dresser 47 back and forth in contact with the periphery of the wheel. It is to be noted that this last-named result is obtained, through the medium of valve 42, without in any way disturbing the predetermined setting of speed control valve 48, associated with the reversing valve device 18 and manually adjustable, (by its attached handle, Fig. 8), as described in the aforesaid copending application of Drake and Hubbell, to control the speed at which the table 12 is moved back and forth during any given grinding operation. As a result of this, after the wheel has been dressed, the grinding operation can be resumed at the same speed previously determined upon, since the full completed movement of lever 36 into contact with starting button 37 causes valve 42 to move to its wide-open position.

In the use of the machine for grinding by straight inward cuts, involving no reciprocation of the work in contact with the wheel, it is necessary only to shut off the valve 48 completely, thus discontinuing the fluid pressure supply. Thereupon, the movement of lever 36 to starting position insures the desired supply of water for the grinding operation and also insures the desired rotation of the work,—in the absence, however, of any table travel whatsoever.

As shown most clearly in Fig. 5, the invention affords an automatic means for insuring a lowered speed of travel for the table, just prior to reversal thereof; the lowering of the speed taking place at that moment when the plunger 72 reaches the apex of the stationary cam member 74, at which instant the rocking member 22 is about to spring to its extreme position to definitely make the pressure fluid active on the other side of the piston to reverse the direction of travel of the table. In this manner the detrimental shocks incidental to reversal at high speeds are avoided. For this purpose is provided a lever 49, pivoted at 50 to the fixed framework, and carrying on its free end, adjacent to the rocking member 22, a roller 51. Said roller 51 lies in the path of inclined cam surfaces 52 and 53 formed, respectively, on the table dogs 23 and 24. The surfaces 52 and 53 are so disposed, with relation to the dogging surfaces proper, as to make contact with the roller 51, during the reciprocations of table 12, just prior to the engagement of member 22 by one or the other of said dogging surfaces. In this way, just before each reversal of the table, the free end of lever 49 is depressed; in consequence of which, by means of link 54, a valve 55 in fluid pressure supply pipe 17 is partially closed. This throttles the fluid pressure supply, and thus decreases the speed of travel of the table, as the latter approaches each end of its stroke.

This automatic speed reduction insures a smooth reversal of the table, with a uniform amount of over-run at each end of the stroke, since the speed imparted just before reversal is invariably a lowered speed of travel, regardless of the speed reached elsewhere in its stroke by said table. This is especially valuable in the grinding of long work of relatively small diameter, where a high table speed is required for efficient operation and where the problem of smooth reversal is a difficult one. Furthermore, this slowing up of the table travel is most desirable whenever a shoulder is to be encountered at the end of the surface being ground, since it prevents the withdrawal of the work in the absence of a complete revolution in contact with the wheel at the point of reversal and thus insures the production of a true diameter at that point.

As shown in Fig. 1, the machine provides, in addition to the motor starting button 37 (normally operated by the lever 36) a starting button 56, which is so connected in the motor circuit with the speed adjustment device 41 as to produce, when held depressed, a very slow rotation of the motor 30. This allows the driving plate 35 to be brought to any desired position, for facilitating the disposal in the machine, or the removal therefrom, of work that is, for various reasons, difficult to handle. In addition, the work may be made to rotate slowly by holding this button 56 pressed in, for testing purposes, or to determine whether or not it is running true, or whether it has been sprung in the grinding operation.

We claim:

1. In a grinding machine, the combination with a table for supporting the work, of means operable by fluid pressure for reciprocating said table, an electric motor carried by said table for rotating the work, and a common control device for said motor and the fluid pressure supply.

2. In a grinding machine, the combination with a table for supporting the work, of means operable by fluid pressure for reciprocating said table, an electric motor carried by said table for rotating the work, and a starting and stopping lever for said motor, adapted to control, simultaneously, the fluid pressure supply.

3. In a grinding machine, the combination with a table for supporting the work, of means operable by fluid pressure for reciprocating said table, an electric motor carried by said table for rotating the work, a grinding wheel, means for supplying water to said wheel, and a starting and stopping lever for said motor, adapted to control, simultaneously, the fluid pressure supply and the supply of water to said wheel.

4. In a grinding machine, the combination with a table for supporting the work, of means operable by fluid pressure for reciprocating said table, an electric motor carried by said table for rotating the work, and a lever movable into opposite positions for respectively starting and stopping said motor and opening and closing the fluid pressure supply, said lever, in an intermediate position, adapted to throttle said supply without starting said motor.

5. In a grinding machine, the combination with a table for supporting the work, of means operable by fluid pressure for reciprocating said table, an electric motor carried by said table for rotating the work, a grinding wheel, means for supplying water to said wheel, and a lever movable into opposite positions for respectively starting and stopping said motor and opening and closing the fluid pressure supply and the supply of water to said wheel, said lever, in an intermediate position, adapted to throttle said fluid pressure supply and furnish water to said wheel without starting said motor.

6. In a grinding machine, means operable by fluid pressure for reciprocating the work, a control device adjustable to vary the speed of said reciprocation, an electric motor, reciprocating with the work, for imparting rotation thereto, and a starting and stopping lever for said motor adapted, in an intermediate position, to throttle the speed of reciprocation of the work, independently of the setting of said control device, and without starting said motor.

7. In a grinding machine, a table adapted to be reciprocated by fluid under pressure, a reversing valve for the pressure fluid, connections including dogs on said table for actuating said reversing valve, throttling valve means separate from said reversing valve, and means on said table adjacent said dogs to actuate said throttling valve means, said last two means being adapted to check the flow of fluid just prior to the actuation of said reversing valve by said dogs, whereby a high speed table may be reversed with a small but definitely fixed overrun, said table resuming speed immediately after reversal.

8. In a grinding machine, a table reciprocable by fluid under pressure, a reversing valve for the pressure fluid, dogs on said table for operating said reversing valve, thereby to procure the reversals of said table, a second valve independent of said reversing valve for the control of said pressure fluid, and means on said table adjacent said dogs for actuating said second valve to reduce the flow of pressure fluid slightly in advance of each actuation of said reversing valve by said dogs, thereby to lower the speed of said table at a moment prior to each reversal of its travel.

9. In a grinding machine, a table reciprocable by fluid under pressure, a reversing valve for the pressure fluid, dogs moved by said table for operating said reversing valve, thereby to procure the reversals of said table, a second valve independent of said reversing valve for the control of said pressure fluid, and means operated by said table for actuating said second valve to reduce the flow of pressure fluid slightly in advance of each actuation of said reversing valve by said dogs, thereby to lower the speed of said table at a moment prior to each reversal of its travel.

10. In a grinding machine, a reciprocable table, fluid pressure means employing a substantially non-compressible fluid for operating said table, a reversing valve for said fluid, means for operating said reversing valve to procure reversals of said table, and means to decelerate the table to given low speed at the moment that the reversing valve first produces an effect on the fluid under pressure in the act of reversing the motion of the table, said decelerating means acting through control of the fluid under pressure and having an unvarying effect on the table to enable the length of the table stroke to be maintained at an adjusted length despite variations in speed of the table travel between the limits of the stroke.

11. In a grinding machine, a reciprocable table, fluid-pressure means employing a substantially non-compressible fluid for operating said table, a table reversing member, table dogs adapted for coaction with said reversing member for reversing the direction of travel of said table, a reversing valve actuated by said reversing member, and means automatically acting on the fluid under pressure and effective at that moment when the reversing valve first starts to exert its effect upon the fluid to bring the flow of fluid operating the table to a definite low volume.

12. In a grinding machine, a reciprocable table, fluid pressure means employing a substantially non-compressible fluid for operating said table, means for reversing the direction of travel of said table, and means operating on the flow of fluid under pressure prior to the reversal thereof for causing it to operate the table through a given range of speed in its negative acceleration prior to the reversal thereof, thus to maintain a predetermined length of the stroke of said table notwithstanding variations in table inertia due to changes in table speed.

JAMES N. HEALD.
ALBERT TURNER.